US012614453B2

(12) United States Patent
Ying et al.

(10) Patent No.: US 12,614,453 B2
(45) Date of Patent: Apr. 28, 2026

(54) VEHICLE BLIND ZONE DETECTION METHOD

(71) Applicant: PATEO CONNECT+ Technology (Shanghai) Corporation, Shanghai (CN)

(72) Inventors: Zhenkai Ying, Shanghai (CN); Chen Liang, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 92 days.

(21) Appl. No.: 18/619,584

(22) Filed: Mar. 28, 2024

(65) Prior Publication Data

US 2024/0242606 A1 Jul. 18, 2024

Related U.S. Application Data

(63) Continuation of application No. PCT/CN2021/136394, filed on Dec. 8, 2021.

(30) Foreign Application Priority Data

Sep. 30, 2021 (CN) .......................... 202111168648.6

(51) Int. Cl.
G08G 1/0967 (2006.01)
H04W 4/44 (2018.01)

(52) U.S. Cl.
CPC ........ G08G 1/096766 (2013.01); H04W 4/44 (2018.02)

(58) Field of Classification Search
CPC ....... H04W 4/40; H04W 4/027; H04W 88/06; H04L 67/12; E05B 81/76; G06V 20/58; H04B 1/38; G08G 1/166
See application file for complete search history.

(56) References Cited

U.S. PATENT DOCUMENTS

2015/0304817 A1* 10/2015 Yorifuji ................ H04W 4/027
455/456.1
2016/0121791 A1 5/2016 Shimizu
(Continued)

FOREIGN PATENT DOCUMENTS

CN 202617105 U * 12/2012 .............. H04B 1/38
CN 104112371 A 10/2014
(Continued)

OTHER PUBLICATIONS

The World Intellectual Property Organization (WIPO) International Search Report for PCT/CN2021/136394 Jun. 8, 2022 5 Pages (including translation).

*Primary Examiner* — Yuri Kan, P.E.

(74) *Attorney, Agent, or Firm* — Anova Law Group, PLLC

(57) ABSTRACT

A vehicle blind zone detection method includes establishing a radio communication with a communication device carried by a pedestrian, detecting the pedestrian and obtaining position information of the pedestrian based on the radio communication, and operating a vehicle based on the position information of the pedestrian according to a driving environment. The communication device carried by the pedestrian is able to switch between a low-power mode and a long-distance communication mode.

17 Claims, 5 Drawing Sheets

(56)            References Cited

U.S. PATENT DOCUMENTS

| | | | |
|---|---|---|---|
| 2016/0140843 A1 * | 5/2016 | Tosa | H04W 4/40 |
| | | | 340/989 |
| 2017/0057497 A1 * | 3/2017 | Laur | G06V 20/58 |
| 2020/0047668 A1 * | 2/2020 | Ueno | G08G 1/166 |
| 2020/0157873 A1 * | 5/2020 | Sabatini | E05B 81/76 |
| 2021/0335157 A1 * | 10/2021 | Li | H04L 67/12 |
| 2022/0284815 A1 * | 9/2022 | Hwang | H04W 4/40 |

FOREIGN PATENT DOCUMENTS

| | | | | |
|---|---|---|---|---|
| CN | 104167113 A | 11/2014 | | |
| CN | 107731009 A | 2/2018 | | |
| CN | 108010383 A | 5/2018 | | |
| CN | 110393039 A | 10/2019 | | |
| CN | 111223333 A | 6/2020 | | |
| CN | 113034954 A | 6/2021 | | |
| CN | 113353100 A | 9/2021 | | |
| DE | 102016217531 A1 | 3/2018 | | |
| KR | 20160006306 A | * | 1/2016 | H04W 88/06 |

* cited by examiner

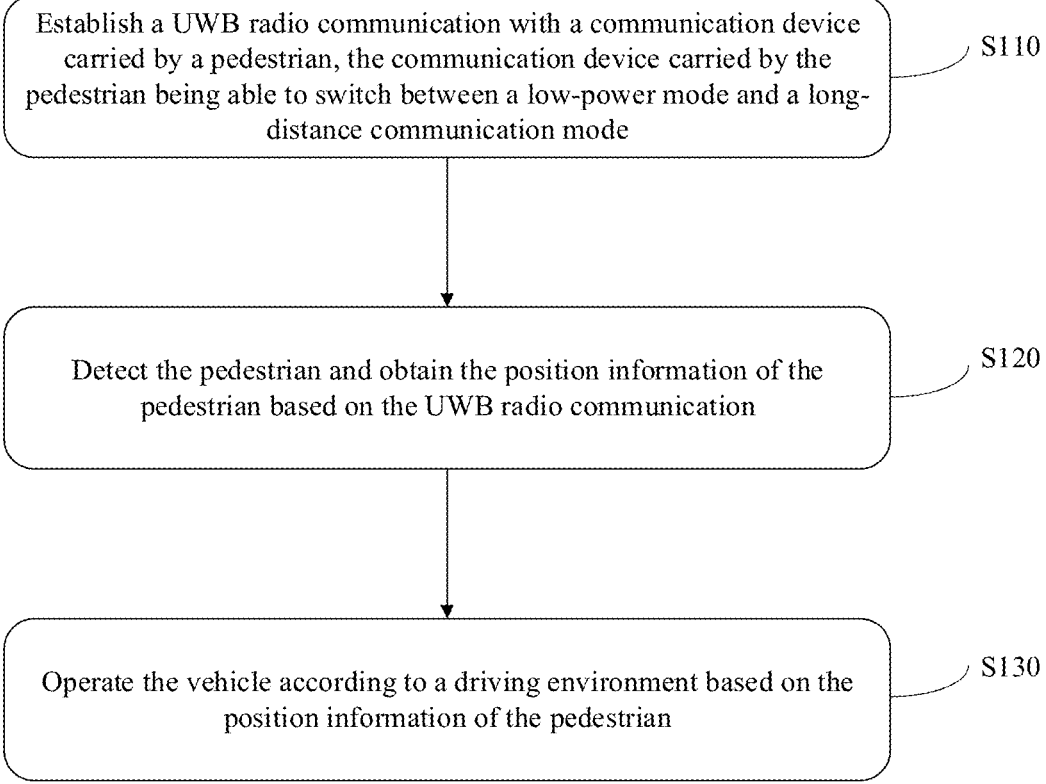

Establish a UWB radio communication with a communication device carried by a pedestrian, the communication device carried by the pedestrian being able to switch between a low-power mode and a long-distance communication mode — S110

Detect the pedestrian and obtain the position information of the pedestrian based on the UWB radio communication — S120

Operate the vehicle according to a driving environment based on the position information of the pedestrian — S130

FIG. 1

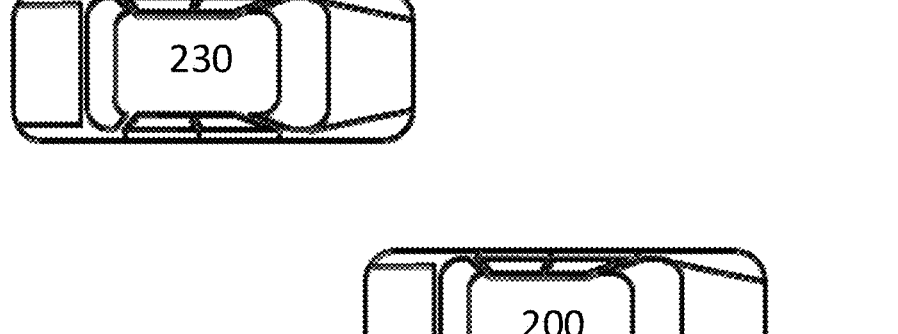
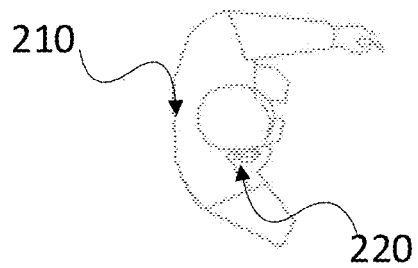
FIG. 3

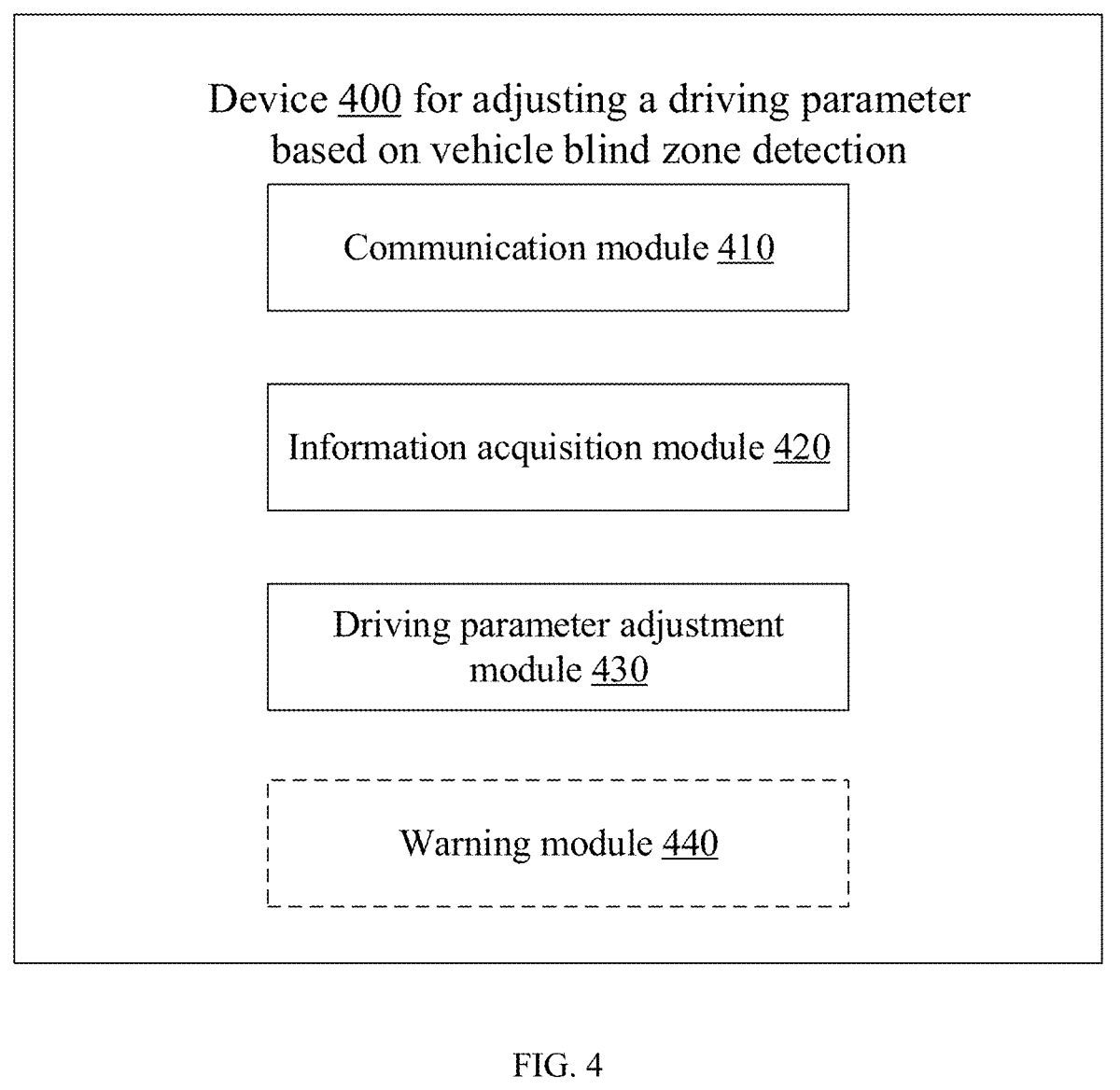

Device 400 for adjusting a driving parameter
based on vehicle blind zone detection Communication module 410

Information acquisition module 420

Driving parameter adjustment
module 430

Warning module 440

FIG. 4

Electronic apparatus
500

Processor 510

Memory 520

FIG. 5

VEHICLE BLIND ZONE DETECTION METHOD

CROSS-REFERENCE TO RELATED APPLICATION

The present disclosure is a continuation of International Application No. PCT/CN2021/136394, filed Dec. 8, 2021, which claims priority to Chinese Patent Application No. 202111168648.6, filed on Sep. 30, 2021, the entire contents of both of which are incorporated herein by reference.

TECHNICAL FIELD

The present disclosure relates to the smart traffic technology field and, more particularly, to a vehicle blind zone detection method using an ultra-wideband (UWB) or SparkLink/NearLink radio communication technology.

BACKGROUND

A driver sits in a normal driving seat of a vehicle and cannot directly observe a specific situation around the vehicle because a vehicle body blocks the sight of the driver. An area that cannot be directly observed by the driver is a vehicle blind zone. If another vehicle is driving in the vehicle blind zone, or a pedestrian is walking in the vehicle blind zone, accidents often happen since the driver cannot observe the vehicle blind zone. In the existing technology, the driver cannot observe the vehicle blind zone, which causes a safety issue for vehicle driving.

SUMMARY

Embodiments of the present disclosure provide a vehicle blind zone detection method. The method includes establishing a radio communication with a communication device carried by a pedestrian, detecting the pedestrian and obtaining position information of the pedestrian based on the radio communication, and operating a vehicle based on the position information of the pedestrian according to a driving environment. The communication device carried by the pedestrian is able to switch between a low-power mode and a long-distance communication mode.

Embodiments of the present disclosure provide a device for adjusting a driving parameter based on vehicle blind zone detection. The device includes a communication module, an information acquisition module, and a driving parameter adjustment module. The communication module is configured to establish communication with a communication device carried by a pedestrian within a communication range based on a wireless communication technology. The communication device carried by the pedestrian is able to switch between a low-power mode and a long-distance communication mode. The information acquisition module is configured to detect the pedestrian and obtain position information of the pedestrian based on the radio communication. The driving parameter adjustment module is configured to operate a vehicle based on the position information of the pedestrian according to the driving environment.

Embodiments of the present disclosure provide an electronic apparatus including one or more processors and one or more memories. The one or more memories are communicatively connected to the one or more processors and store programs that, when executed by the one or more processors, cause the one or more processors to establish a radio communication with a communication device carried by a pedestrian, detect the pedestrian and obtaining position information of the pedestrian based on the radio communication, and operate a vehicle based on the position information of the pedestrian according to a driving environment. The communication device carried by the pedestrian is able to switch between a low-power mode and a long-distance communication mode.

BRIEF DESCRIPTION OF THE DRAWINGS

FIG. 1 is a schematic flowchart of a vehicle blind zone detection method according to some embodiments of the present disclosure.

FIG. 3 is a schematic diagram showing another application scenario of a vehicle blind zone detection method according to some embodiments of the present disclosure.

FIG. 4 is a schematic structural diagram of a device for adjusting a driving parameter based on vehicle blind zone detection according to some embodiments of the present disclosure.

FIG. 5 is a schematic diagram of an electronic apparatus according to some embodiments of the present disclosure.

DETAILED DESCRIPTION OF EMBODIMENTS

Figure 2:
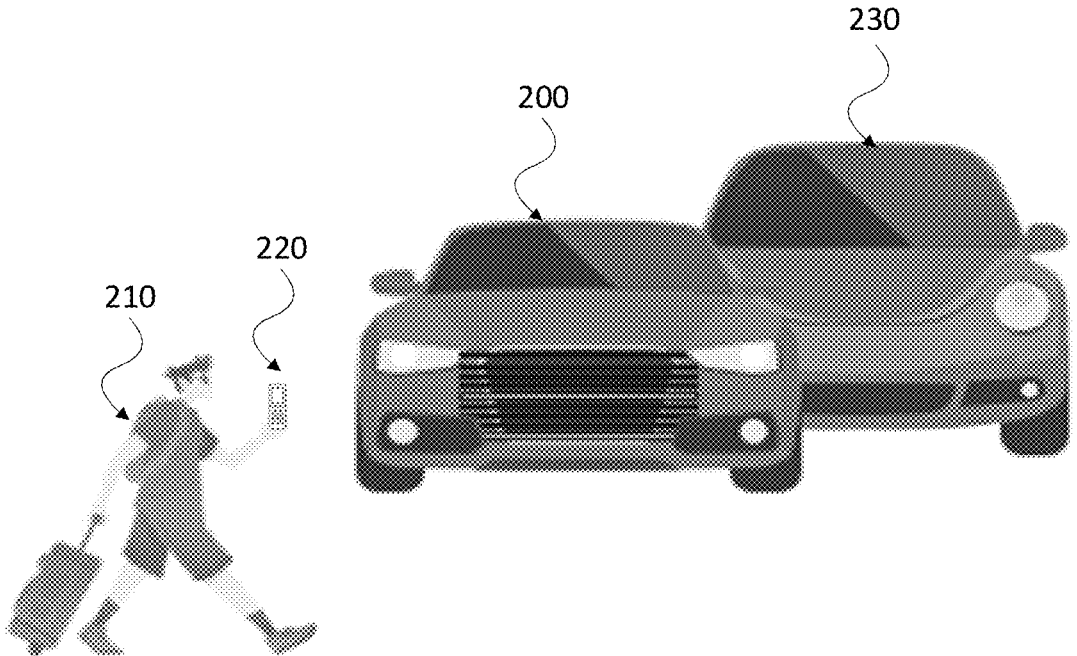
FIG. 2 is a schematic diagram showing an application scenario of a vehicle blind zone detection method according to some embodiments of the present disclosure.

To better understand the present disclosure, various aspects of the present disclosure are described in detail with reference to the accompanying drawings. These detailed descriptions are merely exemplary embodiments of the present disclosure and should not limit the scope of the present disclosure. Throughout the entire specification, same reference numerals denote same elements. The expression "and/or" can include any and all combinations of one or more items of listed items.

In the accompanying drawings, to facilitate description, a size, a dimension, and a shape of an element have been slightly adjusted. The accompanying drawings are exemplary and are not drawn strictly to scale. In addition, in the present disclosure, the order in which steps are described does not necessarily indicate an order in which the steps occur in an actual operation, unless otherwise explicitly specified or deduced from the context.

Furthermore, expressions such as "comprising," "comprising of," "having," "including," and/or "including of" are open-ended expressions in this specification, which indicate the presence of the stated features, elements, and/or members but does not exclude the presence of one or more other features, elements, members, and/or combinations thereof. Moreover, when the expression such as "at least one of" appears after a list of features, the expression modifies the entire list of features, rather than just an individual element in the list. In addition, when embodiments of the present disclosure are described, the term "can" indicates "one or more embodiments of the present disclosure." Furthermore, the term "exemplary" is intended to refer to an example or illustration.

Unless otherwise specified, all terms used here (including engineering and scientific terms) have the same meanings as understood by those skilled in the art of the present disclosure. Unless otherwise stated in the present disclosure, words defined in a common dictionary should be interpreted as having the same meaning as in the relevant technical context, rather than in an idealized or overly formal sense.

When there is no conflict, embodiments in the present disclosure and the features of embodiments of the present disclosure can be combined with each other.

A vehicle of the present disclosure can include but is not limited to an environmental perception module, a communication module, a positioning module, a decision-making module, a control module, and an execution module. The environmental perception module can include but is not limited to a camera, a night vision device, a lidar, a millimeter-wave radar, an ultrasonic sensor, a dynamic stability control system, etc., for perceiving a vehicle speed, a driving direction, a motion attitude, a road traffic condition, etc. The dynamic stability control system can integrate a camera and a sensor of the dynamic stability control system. The communication module can include, but is not limited to, short-range communication technology, Bluetooth, Wi-Fi, Zigbee, radio frequency identification (RFID), ultra-wideband (UWB), SparkLink/NearLink, 4G, 5G, narrow band internet of things (NB-IoT), and long term evolution (LTE), which can communicate with another vehicle or an environment perception module based on any one or more of standard protocols IEEE802.11P or IEEE 1609. The positioning module can use a global navigation satellite system (GNSS). The execution module can include, but is not limited to, an engine actuator, a motor actuator, and a brake actuator.

In addition, the vehicle can also be configured with a wheel speed sensor, an acceleration sensor, a MEMS gyroscope, a steering angle sensor, and an inertial navigation sensor to obtain vehicle attitude data of a vehicle acceleration and a steering angle. In some embodiments, an inertial navigation algorithm can be used to calculate an attitude, a speed, and a position parameter of the vehicle. For example, an attitude matrix of the vehicle can be calculated in real-time by obtaining data from the MEMS gyroscope and the accelerometer. By obtaining data from the GNSS positioning module, positioning data of the moment can be obtained to obtain the motion attitude and position data of the vehicle through the attitude.

A vehicle blind zone detection method of embodiments of the present disclosure can be applied to connected vehicles to enable real-time communication between vehicles (Vehicle-to-Vehicle, V2V) and between vehicles and road infrastructure (Vehicle-to-Infrastructure, V2I). The road infrastructure can send a state of traffic lights, time required for a next switch of the state of the traffic lights, and a location and a direction of an intersection to the vehicle using the V2I technology.

Embodiments of the present disclosure are described with reference to the accompanying drawings below. The radio communication can use technologies such as UWB, SparkLink/NearLink, etc. Embodiments of the present disclosure are described by taking the UWB radio communication as an example. In other embodiments, the radio communication can use SparkLink/NearLink technology.

FIG. 1 is a schematic flowchart of a vehicle blind zone detection method according to some embodiments of the present disclosure. FIG. 2 is a schematic diagram showing an application scenario of the vehicle blind zone detection method according to some embodiments of the present disclosure. FIG. 3 is a schematic diagram showing another application scenario of the vehicle blind zone detection method according to some embodiments of the present disclosure.

Refer to FIGS. 1 to 3, the vehicle blind zone detection method includes the following processes.

At S110, a UWB radio communication is established with a communication device 220 carried by a pedestrian 210.

The communication device 220 carried by the pedestrian is able to switch between a low-power mode and a long-distance communication mode.

At S120, the pedestrian 210 is detected and the position information of the pedestrian 210 is obtained based on the UWB radio communication.

At S130, the vehicle 200 is controlled according to a driving environment based on the position information of the pedestrian 210.

In some embodiments, the communication device 220 carried by the pedestrian 210 can include a smartphone and a key fob with a UWB radio communication module. The communication device 220 can be communicatively connected to various members, such as a UWB transceiver, a communication device, and a vehicle computer carried by the vehicle 200. The UWB transceiver carried by the vehicle 200 can be installed at various positions of the vehicle 200, such as inside the vehicle or on a top of the vehicle. For example, the UWB communication can be performed on the communication device 220 and the UWB transceiver carried by the vehicle 200. In some other embodiments, the communication device 220 can receive a GNSS signal from a GNSS satellite.

The UWB radio communication module can relate to the UWB radio technology, which uses a signal with a very low energy level to perform short-range and high-bandwidth communication across most of the radio spectrum. With this technology, a precise position of an object such as a smartphone, a key fob, and a tracking label can be precisely positioned by measuring time required for the ultra-short radio pulse to travel between devices that are configured to use the UWB to perform an operation. An accuracy provided by using the UWB technology can be obviously better than an accuracy provided by GNSS technology.

In civilian applications, achievable horizontal accuracy using a GNSS signal can be horizontally within a few meters, while achievable accuracy using a UWB signal can be horizontally within a few centimeters. The accuracy can be higher with the UWB signal because of the UWB radio signal with a steep edge. The UWB radio signal can be detected and processed to perform a high-precision measurement.

Therefore, the UWB radio communication can be used to determine various parameters, such as a current position of the pedestrian 210, a current position of the vehicle 200, and a distance between the vehicle 200 and the pedestrian 210, with accuracy higher than achievable accuracy by using the GNSS signal (or verbal information).

In addition, the UWB signal can penetrate various obstacles, such as a wall. Thus, the UWB communication can be performed between the vehicle 200 and the pedestrian 210. Therefore, in a scenario where the GNSS signal is poor, such as in an underground parking lot, the UWB communication can also allow the UWB transceiver, the communication device, and/or the member, such as the vehicle computer within the vehicle to communicate with the communication device 220 carried by the pedestrian. Thus, the position of the pedestrian can be accurately determined. In addition, the UWB signal cannot interfere with a cellular signal and a GNSS signal. Thus, the UWB signal can exist with the cellular signal and the GNSS signal. In embodiments of the present disclosure, the GNSS signal (when applicable) can be used to identify an approximate position of the pedestrian 210 and/or the vehicle 200. Then, the UWB signal can be used to identify a more accurate position of the pedestrian 210 and/or the vehicle 200 based on the approximate position.

In some embodiments, a UWB radio communication module of the communication device 220 carried by the pedestrian 210 can switch between a low-power mode and a long-distance communication mode instead of staying in a communication state continuously to save time and power. For example, by using a relative position between the pedestrian 210 and the vehicle 200, whether the pedestrian 210 is on the road can be determined according to map data information by the vehicle 200. If the pedestrian 210 is on the road, the position information of the pedestrian 210 can be sent to another vehicle 230 through V2X. Since the vehicle includes a V2X apparatus, the vehicle can include a positioning apparatus with a high enough accuracy. The relative positioning between the vehicle and the pedestrian can be performed according to time of flight (TOF) of the UWB of the vehicle and the UWB of the pedestrian. The positioning can be high. Thus, the vehicle 200 can accurately obtain the position information of the pedestrian on the road and send the position information to the another vehicle 230 through V2X.

Since the UWB communication consumes power of a mobile communication device, when the communication device 220 carried by the pedestrian 210 is on the road, the communication device 220 can automatically switch to the long-distance communication mode. When the communication device 220 is indoors or not on the road, the communication device 220 can switch to the low-power mode.

For example, the communication device 220 carried by the pedestrian 210 can be configured to cause the UWB radio communication module to be in the long-distance communication mode based on the position information within the predetermined range determined by the GNSS positioning coordinates. For example, when the GNSS positioning coordinate indicates that the pedestrian 210 is currently not in the current road range in which the vehicle 200 drives, the UWB radio communication module of the communication device 220 can remain in the low-power mode. In addition, for example, when the pedestrian 210 enters the road range and enters the target vehicle, the UWB communication device 220 carried by the pedestrian can also be manually set to the low-power mode to save power. On the contrary, when the GNSS positioning coordinate indicates that the pedestrian 210 is currently in the current road range in which the vehicle 200 drives, the UWB radio communication module of the communication device 220 can enter the long-distance communication mode to establish the UWB communication with the vehicle 200. Thus, more accurate position information of the pedestrian 210 can be obtained, or information such as a motion trend can be obtained.

In some embodiments, operating the vehicle according to a driving environment can include determining whether the pedestrian 210 affects the current driving behavior based on a changing trend of a position coordinate of the pedestrian 210, maintaining the current driving operation of the vehicle when the pedestrian 210 does not affect the current driving behavior, and performing one of a deceleration operation, a lane change operation, a waiting operation, or an emergency stop operation when the pedestrian 210 affects the current driving behavior.

As shown in FIG. 2, in an exemplary scenario, based on the changing trend of the position coordinate of the pedestrian 210, when the pedestrian 210 is determined to affect the current driving behavior, for example, the pedestrian 210 is determined to cross the lane, the vehicle 200 can perform one of the deceleration operation, the lane change operation, and the emergency stop operation to avoid a traffic accident.

As shown in FIG. 3, in another exemplary scenario, based on the changing trend of the position coordinate of the pedestrian 210, when the pedestrian 210 is determined to not affect the current driving behavior, for example, the pedestrian 210 is determined to continue to walk along the road edge, the vehicle 200 can maintain the current driving operation.

As shown in FIG. 3, in yet another exemplary scenario, based on the changing trend of the position coordinate of the pedestrian 210, when the pedestrian 210 is determined to affect the current driving behavior, for example, the vehicle is parked by the roadside and the door is about to be opened, and the pedestrian 210 continues walking along the road edge and intersects with the vehicle, the vehicle 200 can perform the waiting operation to avoid a collision. In some embodiments, the vehicle blind zone detection method can also include notifying another vehicle 230 nearby the position information of the pedestrian 210 based on the V2X communication technology to cause the another vehicle 230 to operate the vehicle based on the position information of the pedestrian according to the driving environment.

In some embodiments, when the pedestrian 210 enters or is within the blind zone range of the vehicle 200, it is often difficult for the vehicle 200 to timely make a corresponding avoid operation to avoid risks. Thus, for the vehicle 230 around the vehicle 200, for example, especially for the vehicle 230 behind the vehicle 200, since the front vehicle blocks the vehicle behind, it can be more difficult for the vehicle 230 to detect the pedestrian. However, according to the vehicle blind zone detection method of embodiments of the present disclosure, the position information of the pedestrian 210 can be notified to the another vehicle 230 nearby based on the V2X communication technology to cause the another vehicle 230 to operate the vehicle based on the position information of the pedestrian according to the driving environment to further avoid the traffic accident. The description of the another vehicle 230 operating the vehicle according to the driving environment is similar as the description of the vehicle 200 operating the vehicle according to the driving environment and is not repeated here.

In some embodiments, the vehicle blind zone detection method can further include, in response to obtaining the position information of the pedestrian 210, issuing a warning message to prompt, for example, the pedestrian to be aware of and avoid the vehicle or a driver to be aware of the pedestrian and take an appropriate action. In some embodiments, the warning message can include one or more of an optical signal, an audio signal, and a video signal. In some embodiments, an augmented reality system can be configured to display a warning image at a front window or a side window. The images can include a warning message.

In the vehicle blind zone detection method of embodiments of the present disclosure, the UWB radio communication technology can be used to detect the blind zone of the vehicle. This method can achieve the following advantages. Possibility of a traffic accident can be reduced, safety of vehicle driving can be improved. Without depending on conventional visual analysis technology, the cost can be lowered. The UWB communication module of the communication device carried by the pedestrian can switch between the low-power mode and the long-distance communication mode based on the positioning coordinate, which prevents the communication device from always staying in the communication mode with high power consumption, which saves time and power. The vehicle can notify the vehicle around through the V2X technology to avoid the traffic accident to further improve the safety of the vehicle driving.

Another aspect of the present disclosure provides a device 400 for adjusting a driving parameter based on the blind zone detection. FIG. 4 is a schematic structural diagram of a device 400 for adjusting the driving parameter based on the vehicle blind zone detection according to some embodiments of the present disclosure.

As shown in FIG. 4, the device 400 for adjusting the driving parameter based on the blind zone detection includes a communication module 410, an information acquisition module 420, and a driving parameter adjustment module 430. The communication module 410 can be configured to establish the communication with the communication device 220 carried by the pedestrian 210 in the communication range based on the UWB radio communication technology. The communication device 220 carried by the pedestrian can switch between the low-power mode and the long-distance communication mode. The information acquisition module 420 can be configured to detect the pedestrian 210 and obtain the position information of the pedestrian 210 based on the UWB radio communication. The driving parameter adjustment module 430 can be configured to operate the vehicle according to the driving environment based on the position information of the pedestrian 210.

In some embodiments, the communication device 220 carried by pedestrian 210 can include the smartphone and the key fob having the UWB radio communication module. The communication device 220 can be communicatively connected to various members, such as the UWB transceiver, the communication device, and the vehicle computer carried by the vehicle 200. The UWB transceiver carried by the vehicle can be arranged at various positions of the vehicle 200, such as inside of the vehicle or on a top of the vehicle. For example, the communication device 220 can perform the UWB communication with the UWB transceiver carried by the vehicle. In some other embodiments, the communication device 220 carried by pedestrian 210 can receive a GNSS signal from a GNSS satellite.

In some embodiments, the driving parameter adjustment module 430 can be configured to determine whether the pedestrian 210 affect the current driving behavior based on the changing trend of the position coordinate of the pedestrian, when the pedestrian 210 does not affect the current driving behavior, maintain the current driving operation of the vehicle, and when the pedestrian 210 affects the current driving behavior, perform one of the deceleration operation, the lane change operation, the waiting operation, or the emergency stop operation.

Refer to FIG. 2, in an exemplary scenario, based on the changing trend of the position coordinate of the pedestrian, when the pedestrian 210 is determined to affect the current driving behavior, for example, the pedestrian 210 is determined to cross the lane, the vehicle 200 can perform one of the deceleration operation, the lane change operation, or the emergency stop operation to avoid the traffic accident.

Refer to FIG. 3, in another exemplary scenario, based on the changing trend of the position coordinate of the pedestrian, when the pedestrian 210 is determined to not affect the current driving behavior, for example, the pedestrian 210 is determined to continue walking along the road edge, the vehicle 200 can maintain its current driving operation.

Refer to FIG. 3, in another exemplary scenario, based on the changing trend of the position coordinate of the pedestrian 210, when the pedestrian 210 is determined to affect the current driving behavior, for example, when the vehicle is parked by the roadside and the door is about to be opened, the pedestrian 210 is determined to continue walking along the road edge and intersect with the vehicle, the vehicle 200 can perform the waiting operation to avoid the collision.

In some embodiments, the communication module 410 can also be configured to notify the another vehicle 230 around the position information of the pedestrian 210 based on the V2X communication technology to cause the another vehicle 230 to operate the vehicle based on the position information of the pedestrian 210 according to the driving environment.

In some embodiments, when the pedestrian 210 enters or is within the blind zone range of the vehicle 200, it is often difficult for the vehicle 200 to timely make a corresponding avoid operation to avoid risks. Thus, for the vehicle 230 around the vehicle 200, for example, especially for the vehicle 230 behind the vehicle 200, since the front vehicle blocks the vehicle behind, it can be more difficult for the vehicle 230 to detect the pedestrian. However, according to the vehicle blind zone detection method of embodiments of the present disclosure, the position information of the pedestrian 210 can be notified to the another vehicle 230 nearby based on the V2X communication technology to cause the another vehicle 230 to operate the vehicle based on the position information of the pedestrian according to the driving environment to further avoid the traffic accident. The description of the another vehicle 230 operating the vehicle according to the driving environment is similar as the description of the vehicle 200 operating the vehicle according to the driving environment and is not repeated here.

In some embodiments, the device 400 can further include a warning module 440. The warning module 440 can be configured to issue a warning message based on the position information of the pedestrian to prompt, for example, the pedestrian to be aware of and avoid the vehicle or a driver to be aware of the pedestrian and take an appropriate action. In some embodiments, the warning message can include one or more of an optical signal, an audio signal, and a video signal. In some embodiments, an augmented reality system can be configured to display a warning image at a front window or a side window. The images can include a warning message.

In embodiments of the present disclosure, the device for adjusting the driving parameter based on the vehicle blind zone detection can be configured to detect the blind zone of the vehicle using the UWB radio communication technology. With the device, the following advantages can be realized. Possibility of a traffic accident can be reduced, safety of vehicle driving can be improved. Without depending on a conventional visual analysis technology, the cost can be lowered. The vehicle can notify the vehicle around through the V2X technology to avoid the traffic accident to further improve the safety of the vehicle driving.

Figure 5:
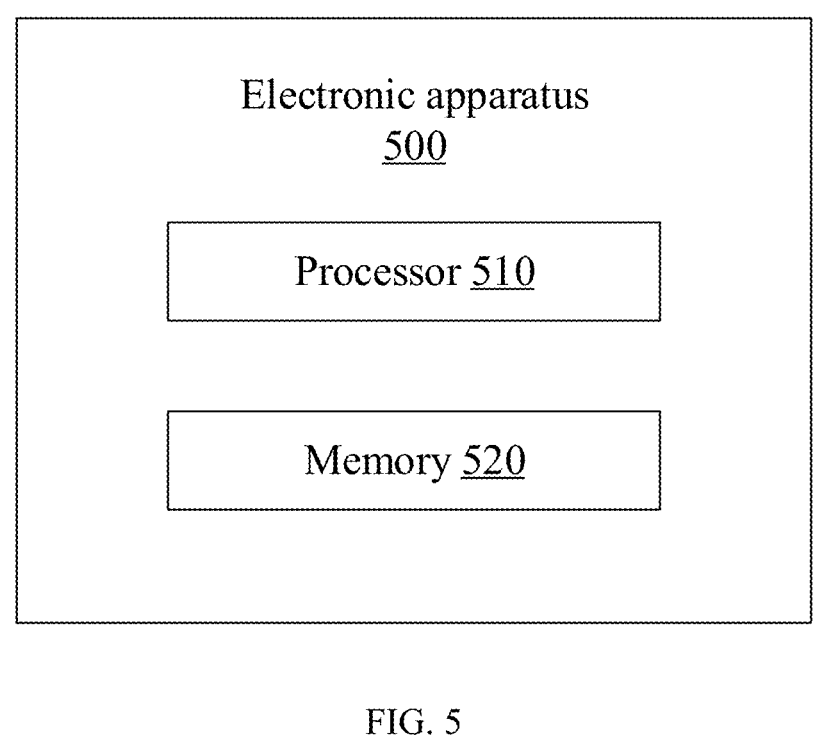

Another aspect of the present disclosure provides an electronic apparatus 500. FIG. 5 is a schematic diagram of the electronic apparatus 500 according to some embodiments of the present disclosure.

As shown in FIG. 5, the electronic apparatus 500 includes a processor 510 and a memory 520 communicatively connected to the processor 510. The memory 520 stores a program that can be executed by the processor 510. When the program is executed by the processor, the processor can be configured to perform the vehicle blind zone detection method. The method can at least include establishing the UWB radio communication with the communication device 220 carried by the pedestrian 210, detecting the pedestrian 210 and obtaining the position information of the pedestrian 210 based on the UWB radio communication, and operating the vehicle based on the position information of the pedestrian 210 and according to the driving environment. The communication device 220 carried by the pedestrian 210 can switch between the low-power mode and the long-distance communication mode.

The memory 520 can be used to store a program (program instructions). In some embodiments, the program can include program codes. The program codes can include a computer operation instruction and a computer execution instruction. The memory 520 can include a read-only memory (ROM), a random access memory (RAM), and a non-volatile memory (NVM), for example, at least one of a magnetic disc storage, an optical disc, or a hard drive.

The processor 510 can be configured to execute the computer execution instruction stored in the memory 520 to implement the vehicle blind zone detection method of embodiments of the present disclosure. The processor 510 can include a central processing unit (CPU), an application-specific integrated circuit (ASIC), or one or more integrated circuits configured to implement embodiments of the present disclosure.

In some embodiments, if the processor 510 and the memory 520 are implemented separately, the processor 510 and the memory 520 can be interconnected and communicate with each other through a bus. The bus can include an industry-standard architecture (ISA) bus, a peripheral component interconnect (PCI) bus, and an extended industry-standard architecture (EISA) bus. The bus can be divided into an address bus, a data bus, and a control bus. However, the bus is not limited to one bus or one type of bus.

In some embodiments, if the processor 510 and the memory 520 are integrated on a chip, the processor 510 and the memory 520 can communicate with each other through an internal interface.

The electronic apparatus of embodiments of the present disclosure can include, for example, a server, a computer, a tablet, and a cell phone, which can be configured to implement the technical solutions of embodiments of the present disclosure. The implementation principle and technical effect can be similar and are not repeated here.

Another aspect of the present disclosure provides a computer-readable storage medium. The computer-readable storage medium can store a computer program. When the computer program is executed by the processor, the processor can be configured to perform a vehicle blind zone detection method including at least the following processes. The method can include establishing the UWB radio communication with the communication device 220 carried by the pedestrian 210, detecting the pedestrian 210 and obtaining the position information of the pedestrian 210 based on the UWB radio communication, and operating the vehicle based on the position information of the pedestrian 210 according to the driving environment. The communication device 220 carried by pedestrian 210 can switch between the low-power mode and the long-distance communication mode.

Those skilled in the art can understand that all or a part of the processes of the above method embodiments can be implemented by hardware associated with the program instruction. The above program can be stored in a storage medium (e.g., a computer-readable storage medium). The computer-readable storage medium of the present disclosure can be a computer-readable signal medium, a computer-readable storage medium, or a combination thereof. For example, the computer-readable storage medium can include, but is not limited to, a system, a device, or an apparatus of electrical, magnetic, optical, electromagnetic, infrared, or semiconductor, or a combination thereof. In some embodiments, the computer-readable storage medium can further include, but is not limited to, an electrical connection with one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or a combination thereof. In the present disclosure, the computer-readable storage medium can be any tangible medium containing or storing a program. The program can be used by an instruction execution system, apparatus, or device, or by being combined with the instruction execution system, apparatus, or device. In the present disclosure, a computer-readable signal medium can include a data signal propagated in a baseband or as a part of a carrier wave. The data signal can carry computer-readable program codes. The propagated data signal can include but is not limited to an electromagnetic signal, an optical signal, or a suitable combination thereof. The computer-readable signal medium can further include any computer-readable medium other than the computer-readable storage medium that can send, propagate, or transfer a program used by the instruction execution system, device, or apparatus or used in connection with the instruction execution system, device, or apparatus. The program codes included in the computer-readable medium can be transferred by any suitable medium, which includes but is not limited to wireless, wire, optical cable, radio frequency (RF), or a suitable combination thereof.

The flowcharts and block diagrams in the accompanying drawings illustrate possible architectures, functions, and operations of devices, methods, and computer program products of embodiments of the present disclosure. Thus, each block of the flowcharts or block diagrams can represent a module, a segment of codes, or a part of codes. The module, the segment of codes, and the part of codes can include one or more executable instructions for implementing a specified logical function. In some other embodiments, the functions marked in the blocks can occur in an order different from an order marked in the accompanying drawings. For example, two neighboring blocks can be performed in parallel or in a reverse order, which is determined according to the related functions. Each block of the block diagrams or the flowcharts and a combination of the blocks of the block diagrams or flowcharts can be implemented by a special system for performing the specified function or operation based on the hardware, or by a combination of the special hardware and the computer instructions.

The modules of embodiments of the present disclosure can be implemented in software or hardware. The modules can also be arranged in a processor. For example, the processor can include a transmission module, an acquisition module, a determination module, and a first processing module. In some embodiments, the names of these modules do not necessarily limit the modules. For example, the transmission module can also be described as "a module for sending an image acquisition request to a connected server."

As another aspect, the computer-readable storage medium of the present disclosure can be included in the above apparatus or can exist separately without being mounted in the apparatus.

According to embodiments of the present disclosure, the objective, the technical solution, and the beneficial effect are further described in detail. The above description is merely a description of some embodiments of the present disclosure and the technology principle used in the present disclosure. Those skilled in the art should understand that the scope of the present disclosure is not limited to the technical solution formed by the above technical features and also covers other technical solutions formed by arbitrarily combining the above technical features or equivalent features without departing from the technical concept of the present disclosure. For example, the other technical solution can include a technical solution formed by combining the above features and the technical features (not limited to) with the similar functions of the present disclosure.

What is claimed is:

1. A vehicle blind zone detection method, the vehicle blind zone being an area that cannot be directly observed by a driver of a vehicle, comprising:

establishing an ultra-wideband (UWB) radio communication with a communication device carried by a pedestrian in the vehicle blind zone, the communication device carried by the pedestrian being able to switch from a low-power mode to a long-distance communication mode of the UWB radio communication when a global navigation satellite system (GNSS) positioning coordinate of the communication device falls within a predetermined range;

obtaining position information of the pedestrian based on the UWB radio communication with the communication device in the long-distance communication mode; and operating the vehicle based on the position information of the pedestrian according to a driving environment.

2. The method according to claim 1, further comprising:

notifying another vehicle nearby of the position information of the pedestrian based on a vehicle-to-everything (V2X) communication technology to cause the another vehicle to operate the another vehicle based on the position information of the pedestrian according to the driving environment.

3. The method according to claim 2, wherein causing the another vehicle to operate the another vehicle based on the position information of the pedestrian according to the driving environment includes:

determining whether the pedestrian affects a current driving behavior based on a change trend of a position coordinate of the pedestrian;

in response to the pedestrian not affecting the current driving behavior, maintaining a current driving operation of the another vehicle; and in response to the pedestrian affecting the current driving behavior, performing one of a deceleration operation, a lane change operation, a waiting operation, or an emergency stop operation.

4. The method according to claim 1, wherein operating the vehicle according to the driving environment includes:

determining whether the pedestrian affects a current driving behavior based on a change trend of a position coordinate of the pedestrian;

in response to the pedestrian not affecting the current driving behavior, maintaining a current driving operation of the vehicle; and in response to the pedestrian affecting the current driving behavior, performing one of a deceleration operation, a lane change operation, a waiting operation, or an emergency stop operation.

5. The method according to claim 1, further comprising:

issuing a warning message as a reminder in response to obtaining the position information of the pedestrian; or displaying a warning image using an augmented reality system in response to obtaining the position information of the pedestrian.

6. The method according to claim 1, wherein;

the predetermined range determined by the GNSS positioning coordinates indicates that the pedestrian is currently on a road where the driver drives the vehicle; and an accuracy of the positioning information of the pedestrian obtained based on the UWB radio communication is in centimeters.

7. A device for adjusting a driving parameter based on vehicle blind zone detection, a vehicle blind zone being an area that cannot be directly observed by a driver of a vehicle, comprising:

one or more processors; and one or more memories communicatively connected to the one or more processors and storing a program that, when executed by the one or more processors, causes the one or more processors to:

establish an ultra-wideband (UWB) radio communication with a communication device carried by a pedestrian in a vehicle blind zone being an area that cannot be directly observed by a driver of a vehicle, the communication device carried by the pedestrian being able to switch from a low-power mode to a long-distance communication mode of the UWB radio communication when a global navigation satellite system (GNSS) positioning coordinate of the communication device falls within a predetermined range;

obtain position information of the pedestrian based on the UWB radio communication with the communication device in the long-distance communication mode; and a operate the vehicle based on the position information of the pedestrian according to a driving environment.

8. The device according to claim 7, wherein the one or more processors are further configured to:

notify another vehicle nearby of the position information of the pedestrian based on a vehicle-to-everything (V2X) communication technology to cause the another vehicle to operate the another vehicle based on the position information of the pedestrian according to the driving environment.

9. The device according to claim 8, wherein the one or more processors are further configured to:

determine whether the pedestrian affects a current driving behavior based on a change trend of a position coordinate of the pedestrian;

in response to the pedestrian not affecting the current driving behavior, maintain a current driving operation of the another vehicle; and in response to the pedestrian affecting the current driving behavior, perform one of a deceleration operation, a lane change operation, a waiting operation, or an emergency stop operation.

10. The device according to claim 7, wherein the one or more processors are further configured to:

determine whether the pedestrian affects a current driving behavior based on a change trend of a position coordinate of the pedestrian;

in response to the pedestrian not affecting the current driving behavior, maintain a current driving operation of the vehicle; and in response to the pedestrian affecting the current driving behavior, perform one of a deceleration operation, a lane change operation, a waiting operation, or an emergency stop operation.

11. The device according to claim 7, wherein the one or more processors are further configured to:

issue a warning message as a reminder in response to obtaining the position information of the pedestrian or display a warning image using an augmented reality system in response to obtaining the position information of the pedestrian.

12. An electronic apparatus comprising:

one or more processors; and one or more memories communicatively connected to the one or more processors and storing a program that, when executed by the one or more processors, causes the one or more processors to:

establish an ultra-wideband (UWB) radio communication with a communication device carried by a pedestrian in a vehicle blind zone being an area that cannot be directly observed by a driver of a vehicle, the communication device carried by the pedestrian being able to switch from a low-power mode to a long-distance communication mode of the UWB radio communication when a global navigation satellite system (GNSS) positioning coordinate of the communication device falls within a predetermined range;

obtain position information of the pedestrian based on the UWB radio communication with the communication device in the long-distance communication mode; and operate the vehicle based on the position information of the pedestrian according to a driving environment.

13. The electronic apparatus according to claim 12, wherein the one or more processors are further configured to:

notify another vehicle nearby of the position information of the pedestrian based on a vehicle-to-everything (V2X) communication technology to cause the another vehicle to operate the vehicle based on the position information of the pedestrian according to the driving environment.

14. The electronic apparatus according to claim 13, wherein the one or more processors are further configured to:

determine whether the pedestrian affects a current driving behavior based on a change trend of a position coordinate of the pedestrian;

in response to the pedestrian not affecting the current driving behavior, maintain a current driving operation of the another vehicle; and in response to the pedestrian affecting the current driving behavior, perform one of a deceleration operation, a lane change operation, a waiting operation, or an emergency stop operation.

15. The electronic apparatus according to claim 12, wherein the one or more processors are further configured to:

determine whether the pedestrian affects a current driving behavior based on a change trend of a position coordinate of the pedestrian;

in response to the pedestrian not affecting the current driving behavior, maintain a current driving operation of the vehicle; and in response to the pedestrian affecting the current driving behavior, perform one of a deceleration operation, a lane change operation, a waiting operation, or an emergency stop operation.

16. The electronic apparatus according to claim 12, wherein the one or more processors are further configured to:

issue a warning message as a reminder in response to obtaining the position information of the pedestrian; or display a warning image using an augmented reality system in response to obtaining the position information of the pedestrian.

17. The electronic apparatus according to claim 12, wherein:

the predetermined range determined by the GNSS positioning coordinates indicates that the pedestrian is currently on a road where the driver drives the vehicle; and an accuracy of the positioning information of the pedestrian obtained based on the UWB radio communication is in centimeters.

* * * * *